May 9, 1961     S. W. EWING     2,983,097
LIGHT-CONTROLLED PARKING METER
Filed July 6, 1955
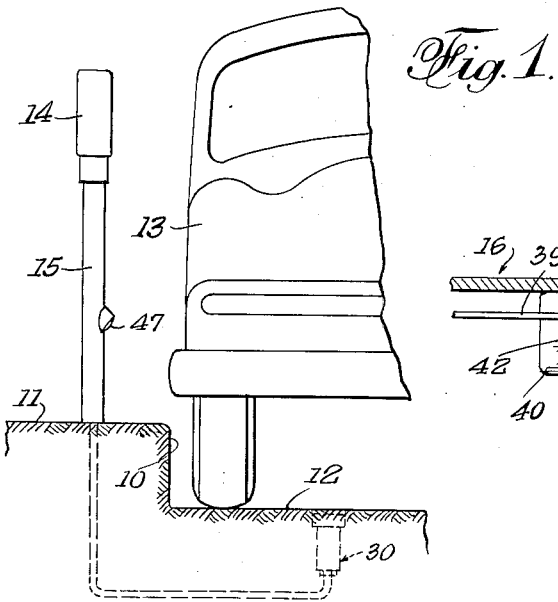
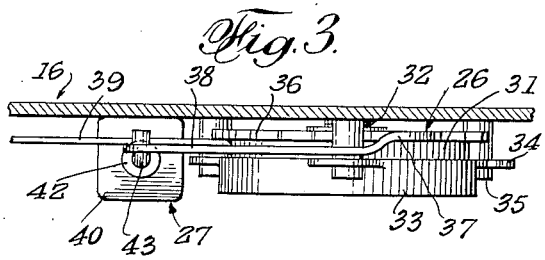
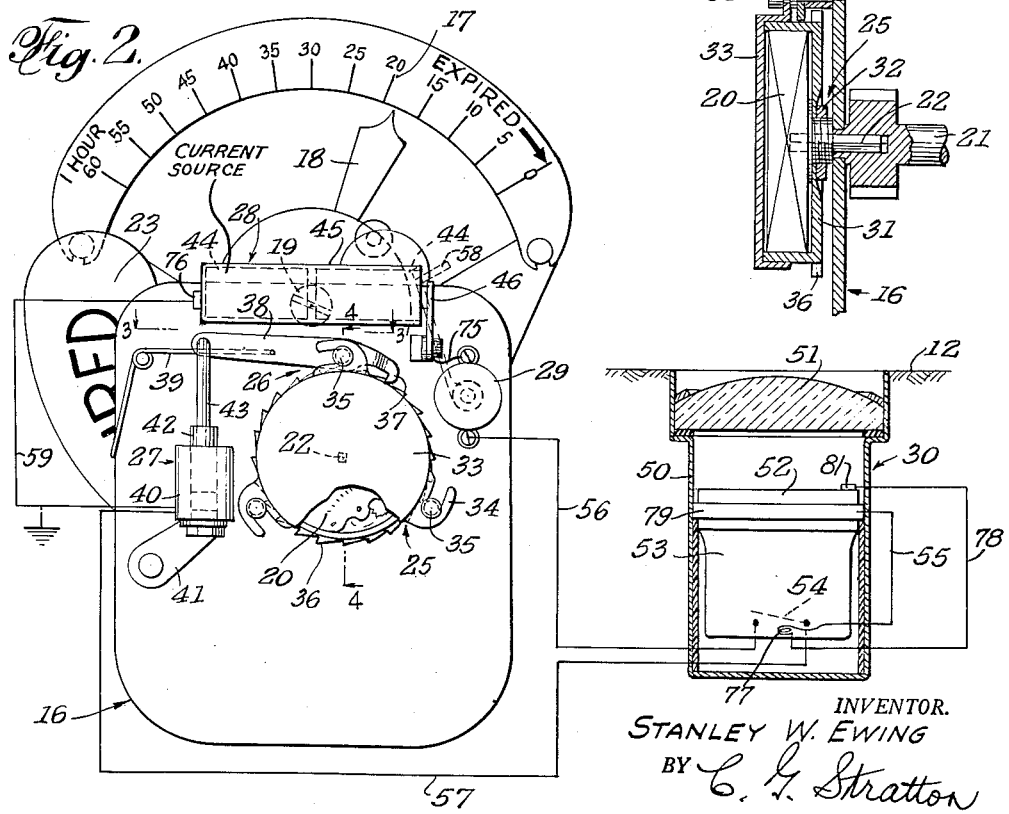
INVENTOR.
STANLEY W. EWING
BY C. G. Stratton
ATTORNEY United States Patent Office 2,983,097
Patented May 9, 1961

2,983,097

LIGHT-CONTROLLED PARKING METER

Stanley W. Ewing, 5177 Overland Ave., Culver City, Calif.

Filed July 6, 1955, Ser. No. 520,170

11 Claims. (Cl. 58—142)

This invention relates to a parking meter that is controlled by light to reset itself to zero or the expired position.

Present meters are time-controlled, the coin or coins setting or allowing a setting of the meter to the time paid for and the meter then running down under control of clockworks until expired. Such meters do not take into account whether a vehicle occupies the space controlled thereby. Therefore, if after paying the meter for a certain parking time, the vehicle is driven away, the meter continues to operate on the unexpired time. It is quite usual for the driver of another vehicle to take advantage of this unexpended time, without cost, with the resultant loss of revenue.

Accordingly, it is an object of the present invention to provide a parking meter that, in addition to its normal time-controlled operation, also has a light-controlled operation that is instituted upon a vehicle leaving the parking area.

Another object of the invention is to provide parking meter means that may be operated by sunlight or, at least, the rays of such light that are present in daylight hours and, optionally, to provide meter means that may be operated by a beam of artificial light.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a broken elevational view showing a parking meter of the present form, as installed, and with relation to a vehicle parked in the space or area controlled by said meter.

Fig. 2 is a semi-diagrammatic view showing the components of the present mechanism as having basis on a typical parking meter of conventional design.

Figs. 3 and 4 are enlarged fragmentary sectional views as taken on lines 3—3 and 4—4, of Figure 2, respectively.

Fig. 1 shows a curb 10 defining between a walk 11 and a roadway 12, the latter constituting the space or area on which an automotive vehicle 13 may be parked, substantially as shown. Said figure also shows that the walk 11, somewhat spaced from curb 10, may mount a parking meter 14. Usually, a post 15 mounts said meter.

With particular reference to Fig. 2, the meter 14 comprises, generally, a spring-operated clockworks 16 upon which is carried a visible scale 17, and which may be coin-controlled or -operated to control movement of an index or pointer 18 that is movable relative to said scale as on a pivot 19. Parking meters, while differing among themselves, have in common the foregoing components. Thus, said meters are clocks that are wound or set in operation by a coin or coins or by a coin-released winder, and run down after the time paid for by said coin or coins has elapsed. Therefore, each such meter includes an escapement means which, in the present instance, is shown at 20 and which is connected to a shaft 21 of the clockworks 16, as by a polygonal-sectioned pin 22. The shaft 21 is operatively connected to the usual clock spring (not shown). It will be clear that the escapement unit 20, by controlling the unwinding movement of shaft 21, which is rotatably mounted in the front plate of the clockworks 16, controls the speed of retrograding movement of index 18 relative to scale 17. Prior meters also include an "Expired" flag 23 that is normally visible, but is movable to a position, as shown, where the same cannot be seen when the meter is operating, and is tripped to resume its visible position when index 18 has reached the zero or expired position and the operation of the meter stops.

In carrying out the invention in accordance with a preferred embodiment thereof, I employ, in combination with a parking meter of the character above described, a rotational mount 25 for the escapement unit 20, ratchet means 26 to releasably hold said unit immovable during normal operation of the meter, solenoid means 27 to operate the ratchet means and, thereby, release the mount 25 for rotational movement, a current source 28 to energize the solenoid means 27, a clockworks-controlled switch 29 which may be normally closed in the embodiment illustrated, a light-operated unit 30, and an electric circuit operatively connecting said latter unit and the solenoid means, current source and switch.

The mount 25 is shown as a rotational cup 31 in which unit 20 is disposed and which is locked to said unit by means of the stud and nut means 32 so there is no relative rotation of the unit and cup but the unit and the cup are free to rotate together, and a fixed cover 33 over said cup to conceal the unit 20. As shown, cover 33 is provided with open-slotted lugs 34 that are engaged with a set of studs 35 carried by the clockworks and from which the unit and its mount may be removed. In any case, the mount holds the escapement unit 20 in position to control the run-down rotation of clockworks shaft 21 through connection to said shaft by square pin 22.

The ratchet means 26 is shown as a set of ratchet teeth 36 on the periphery of the cup 31, and a dog 37 pivotally mounted as one one of the studs 35, to have hooking engagement with said ratchet teeth and formed to have an arm 38 that extends oppositely from the tooth-engaging dog end. A spring 39 is connected to said arm and exerts its resilient force to urge the said dog end into tooth engagement.

Since the ratchet means 26 normally holds the cup 31 and the unit 20 therein non-rotational, when the meter is set into operation by a coin or coins or by a knob released thereby, the means 26 also holds the cup releasably against the force of the spring means of the clockworks when it unwinds and causes retrograding movement of the index 18 controlled by the escapement 20. Thus, when the ratchet means is released, cup 31 and the unit 20 therein will be free to rotate on the axis of clockworks shaft 21 and, thereby, remove the speed control on said shaft. With such control removed, the clockworks 16 runs down quickly and, in a matter of a fraction of a second, the index 18 moves to zero and the "Expired" flag to its visible position. The hereinafter-described means controls said release of the escapement unit 20 by ratchet means 26.

The solenoid means 27 comprises a solenoid coil 40 that is carried by a bracket 41 from the frame of clockworks 16, a floating armature or core 42 movable upon energization of coil 40, and a connection 43 between said core and the arm 38 of the ratchet means 26. The solenoid acts counter to spring 39.

The current source 28 may be brought from outside the meter but is here shown as a pair of dry battery cells 44 housed as in a container 45 and held in place therein by a finger 46 that forms one terminal of said current source. The other terminal is grounded to the clockworks or meter generally, as is also one side of the solenoid coil 40 as represented schematically by the ground conductor 59.

The switch 29 may be of any suitable design. It may be either a normally-closed switch or a normally-open switch according to the mechanical mounting arrangement employed. A normally-closed microswitch with an actuating arm 58 is an example. The same is so placed as to remain closed while the index 18 is at any part of scale 17 except at zero but to be opened by movement of the index 18 against the arm 58 when the index 18 reaches the end of its operating positions while the clockwork is operating and approaches its zero position. One side of said switch 29 is connected to finger terminal 46 of the current source 28.

The foregoing are all contained in and form part of meter 14. The light-operated unit 30, as seen in Fig. 1, is preferably embedded in the roadway 12 and adapted to be shielded from sunlight by vehicle 13 or from an artificial light 47 that may be carried by post 15, also by said vehicle.

In the present instance, unit 30 comprises a preferably metallic container 50 that is embedded in the roadway substantially as shown, a light-passing lens or window 51 closing the open top of said container, a photoelectric cell or unit 52 below the window 51 and in position to be subjected to rays of light passing through said window, and a relay 53 sensitive to the photoelectric current set up by cell 52 and embodying a normally-open switch 54. Only the presence of light impinging on cell 52 will effect closure of switch 54 by passage of generated current through electrical connection 55 between said cell and the relay 53. One side of switch 54 is connected by a conductor 56 to switch 29 and the other side by a conductor 57 to solenoid coil 40.

Any suitable type of sensitive relay may be utilized as the light responsive relay 53, and it need therefore not be described in detail. By way of illustration, it is shown schematically as having an actuating coil 77 connected through conductors 55 and 78 to a base plate 79 and a terminal strip 81 of the photoelectric element 52, which in the embodiment illustrated has been described as a photoelectric cell which is therefore self-generating and produces a current flow in the winding 77 to close the switch 54 when light of sufficient intensity falls upon the upper surface of the photocell sensitive plate 52.

*Operation*

When the meter is not operating, the "Expired" flag is up, index 18 is at zero, switch 29 is open, and switch 54 is being held closed by the light-generated current in photoelectric cell 52. Since switch 29 is open, the solenoid means 27 is unenergized and the source of current 28 is out of circuit.

When the clockworks 16 is operating and the indicator 18 is away from the zero position, it disengages the arm 58 of the normally-closed switch 29 and the light responsive switch 54 of the unit 30 is closed by exposure to light as a result of the departure of the automobile 13 from the parking space 12, a circuit is formed from the finger terminal 46 of the current source 28 through a conductor 75, normally-closed contacts of the microswitch 29, the conductor 56, the contacts of the switch 54, the conductor 57, the winding 40 of the solenoid tripping unit 27, ground wire 59, back to a ground terminal 76 of the current source 28.

When a vehicle 13 is moved into position over unit 30, the operating light, whether sunlight or the beam from light 47, cannot reach the cell 52. Either no current will flow in connection 55 or current of such low intensity that relay 53 will become de-energized, opening switch 54. Now, when a coin or coins is used to set the meter in operation by winding clockworks 16, the switch 29 will be closed. Since switch 54 is open at this time, the circuit through the current source and the solenoid means remains open.

The spring force in the clockworks moves index 18 toward the expired position under control of the escapement unit 20. If the vehicle remains in the mentioned parked position while the meter runs down, the operation will terminate in the conventional manner with the meter showing the "Expired" flag.

If, before the meter has run down, the vehicle is removed from intercepting light to the cell 52, light will impinge said cell and effect closing of switch 54. Since switch 29 is also closed at this time, the circuit through the current source and the solenoid means is closed. The resultant energization of the solenoid coil 40 will effect release of the ratchet means 26 and free the escapement unit to rotate on its axis of mount and, thereby, allow a quick or even sudden run-down of the clockworks. This opens switch 29 and restores the meter to its initial unoperated condition.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. In a parking meter that includes a clockworks that is set into operation by power released by coin insertion into the meter and that has an escapement unit for controlling the run-down operation of the clockworks, the improvement therewith, in combination, of a rotational mount for the escapement unit, means to releasably hold said mount and said unit non-rotational, light-sensitive means subject to be shaded by a vehicle parked in association with the meter, and a solenoid controlled by the light-sensitive means to release the means holding the mount and the escapement unit when light impinges on the light-sensitive means.

2. In a parking meter that includes a clockworks that is set into operation by power released by coin insertion into the meter and that has an escapement unit for controlling the run-down operation of the clockworks, the improvement therewith in combination, of a rotational mount for the escapement unit, means to releasably hold said mount and said unit non-rotational, a solenoid operatively connected to said holding means, light-sensitive means subject to be shaded by a vehicle parked in association with the meter, and an electric circuit connecting said solenoid with a source of current, said circuit being connected to be closed by said latter means to, thereby, energize the solenoid and effect release of the holding means when light impinges on the light-sensitive means.

3. In a parking meter according to claim 2: a switch connected in said circuit, said switch being moved to closed position only during operation of the meter.

4. In a parking meter according to claim 2: a switch connected in said circuit, said switch being moved to closed position only during operation of the meter, and a second normally-open switch operatively connected in said circuit, said second switch being moved to closed position only when light impinges the light-sensitive means.

5. In a parking meter that includes a clockworks that is set into operation by power released by coin insertion into the meter, the combination comprising an escapement unit connected to said clockworks to control the speed of run-down movement of said clockworks, a rotational mount for said unit, releasable means holding said unit and said mount non-rotational during normal run-down operation of the clockworks, and means to release said releasable means to allow the escapement unit and the mount to rotate to remove, thereby, the control on the clockworks so the same will run down rapidly.

6. In a parking meter according to claim 5: in which the releasable means is a ratchet means, and in which the means for releasing the releasable means includes a solenoid connected to said power source, said solenoid releasing the ratchet means when energized by the power source.

7. In combination with a parking meter having clockworks, a run-down controller for said clockworks, and indicator means operated by said clockworks, the improvement comprising a light-sensitive unit subject to being shaded by a vehicle parked in association with the meter and having a normally-open switch close by exposure to light, a power source, an electric circuit connecting said switch to the power source, solenoid means included in said electric circuit, and solenoid-controlled releasable means for holding the controller, and, thereby, the clockworks and the indicating means, in indicating position, said electric circuit being connected to be energized by the power source to actuate the solenoid means and effect release of the releasable means while the clockworks is operating.

8. In combination with a parking meter having clockworks, a run-down controller for said clockworks, and indicator means operated by said clockworks, the improvement comprising a light-sensitive element subject to being shaded by a vehicle parked in association with the meter, a power source, a normally-open switch having a winding connected to said element that closes the switch in response to light-impinging on said element, solenoid means, an electric circuit connecting the power source and the solenoid means to said switch, and solenoid-controlled releasable means for holding the controller, and, thereby, the clockworks and the indicating means in indicating position, said electric circuit being connected to be energized by the power source when said switch is closed to actuate the solenoid means and effect release of the releasable means while the clockworks is operating.

9. In combination with a parking meter having clockworks, a run-down controller for said clockworks, and indicator means operated by said clockworks having operating and zero positions, the improvement comprising a light-sensitive unit subject to being shaded by a vehicle parked in association with the meter, said unit including a first, normally-open switch that is closed in response to light-impinging on said unit, an electric circuit connected to said power source in series with said switch, a second switch connected in said circuit that is responsive to position of the indicator means to be closed during the operating positions thereof, solenoid means in said circuit, and solenoid-controlled releasable means holding the controller, and, thereby, the clockworks and the indicating means, in indicating position, said circuit being connected to be energized by the power source when said switches are closed to actuate the solenoid means and effect release of the releasable means while the clockworks is operating.

10. A parking meter comprising in combination, a parking time indicator having full-time and "expired" positions, clockworks for moving the indicator from the full-time to the "expired" position, releasable speed limiting mechanism for maintaining the indicator speed uniform, said mechanism being movably mounted with a releasable stop, a photoresponsive unit subject to shading by a parked car and responsive to exposure to light in the absence of a parked car for producing an electrical signal, and electro-responsive releasing mechanism for the speed limiting mechanism mechanically connected to said releasable stop, said releasing mechanism being electrically connected to said photoresponsive unit.

11. A residue time-nullifying apparatus for a coin-operated parking meter related to an automobile parking zone and having a manually settable timing mechanism functioning when set to measure residual parking time and including a part movable with time to a zero residual time position, a daylight-responsive photo-electric cell mounted in said zone in position for covering by an automobile upon entering and occupying said zone and for uncovering and exposing upon said automobile leaving said zone, a member having a spring loaded displaced position and functioning when released to engage and move said part to said zero time position, an electric latch and electric control circuit therefor having a deenergized position engageable with and holding said member in its spring loaded displaced position and when energized to release said member, a switch in said circuit, and an electric actuator for said switch connected to said photo-electric cell for closing said switch upon exposure of said cell to energize said latch.

References Cited in the file of this patent
UNITED STATES PATENTS

| | | |
|---|---|---|
| 2,095,114 | Wood et al. | Oct. 5, 1937 |
| 2,096,155 | Breeden | Oct. 19, 1937 |
| 2,152,577 | Weaver | Mar. 28, 1939 |
| 2,251,407 | Johns | Aug. 5, 1941 |
| 2,535,472 | Wood | Dec. 26, 1950 |
| 2,575,650 | Alexander | Nov. 20, 1951 |
| 2,623,933 | Allstadt | Dec. 30, 1952 |
| 2,656,908 | Ellison | Oct. 27, 1953 |